Patented Feb. 8, 1938

2,107,856

UNITED STATES PATENT OFFICE 2,107,856

SALT OF ORTHO HYDROXY QUINOLINE

Joseph Ebert, Westmont, N. J., assignor to The Farastan Company, Philadelphia, Pa., a corporation of Pennsylvania No Drawing. Application January 20, 1936, Serial No. 59,999

1 Claim. (Cl. 260—41)

This invention relates to a new salt of ortho hydroxy quinoline, the benzene sulfonate of ortho hydroxy quinoline.

The ortho hydroxy quinoline benzene sulfonate has a high bactericidal and bacteriostatic action.

Its bactericidal value as tested against staphyloccoccus aureus by the Reddish method is 1 to 10,000 (15 minutes). Its bacteriostatic action tested against the same organism is 1 to 200,000. The salt is soluble in common solvents such as water, dilute and concentrated alcohol, and acetone. Its solutions have a yellowish color.

The salt is somewhat deliquescent and in a hydrated state forms greenish-yellow flakes which melt at 84 to 86° C. When dehydrated in a desiccator over sulfuric acid, however, the melting point is raised to 116 to 118° C. (uncorrected).

Ortho hydroxy quinoline benzene sulfonate has the property of reducing the surface tension of water to a marked degree. For example, when an aqueous solution containing 0.1% of the salt is made, its surface tension is about 48 dynes per centimeter, as compared with the surface tension of pure water, which is about 73 dynes per centimeter. The efficacy of this salt as an antiseptic may be attributed in a large extent to this property of drastically reducing the surface tension of water.

The compound may be prepared in several ways. Stochiometric proportions of ortho hydroxy quinoline and benzene sulfonic acids may be dissolved in a suitable solvent such as alcohol, etc., and the solvent evaporated at a low temperature to give the salt. Or stochiometric amounts of the base and acid may be fused together at approximately the melting point of the base, for example, at 75 to 85° C., for several hours with agitation. These methods of preparing the salt will be illustrated by the following examples.

Example 1.—7.3 parts by weight of ortho hydroxy quinoline are heated together with 9 parts by weight of benzene sulfonic acid (containing 1 molecule of water) in a vessel provided with an agitator and an air-cooled reflux condenser at about 80° C. on a water or steam bath for four to five hours. The melt is purified by recrystallization from water, in which it is quite soluble.

Example 2.—7.3 parts by weight of ortho hydroxy quinoline are dissolved in 50 parts by volume of ethyl or methyl alcohol (which may contain up to 50% of water) and a solution of 9 parts by weight of benzene sulfonic acid (containing 1 molecule of water) in 30 parts by volume of ethyl or methyl alcohol is added. The solvent is evaporated or distilled off and the remaining greenish-yellow crystals, which are ortho hydroxy quinoline benzene sulfonate, are recrystallized from water. The evaporation or distillation of the solvent is preferably carried out at a relatively low temperature, e. g. 60° C. or less. The salt as crystallized from water contains water of hydration and has a melting point of 84 to 86° C., but the water of hydration is readily removed, as by dehydration in a desiccator over sulfuric acid. The dehydrated salt has a melting point of from 116 to 118° C. (uncorrected).

The salt is useful as an antiseptic either for internal or external administration, and is of particular value for antiseptic preparations which are intended for use in contact with mucous membranes, such as the nasal passages.

I claim:

Ortho hydroxy quinoline benzene sulfonate.

JOSEPH EBERT.